United States Patent [19]
Yoo et al.

[11] Patent Number: 5,513,257
[45] Date of Patent: Apr. 30, 1996

[54] METHOD FOR CONTROLLING OVERLOAD IN CENTRALIZED AND DISTRIBUTED OPERATING HYBRID SWITCHING SYSTEM

[75] Inventors: Chan H. Yoo; Byung S. Lee; Young S. Kim, all of Daejeon, Rep. of Korea

[73] Assignees: Electronics and Telecommunications Research; ABD Korea Telecommunications Authority, both of Rep. of Korea

[21] Appl. No.: 343,649

[22] Filed: Nov. 22, 1994

[30] Foreign Application Priority Data

Dec. 15, 1993 [KR] Rep. of Korea ............. 1993-27892

[51] Int. Cl.$^6$ ............................................. H04M 3/00
[52] U.S. Cl. .................... 379/220; 379/134; 379/113; 379/279; 379/221
[58] Field of Search ...................... 379/34, 113, 134, 379/220, 221, 279

[56] References Cited

U.S. PATENT DOCUMENTS

| | | | |
|---|---|---|---|
| 4,511,762 | 4/1985 | Stockdale | 379/279 |
| 4,658,098 | 4/1987 | Wesmann | 379/113 |
| 4,809,318 | 2/1989 | Schoute | 379/279 |
| 4,974,256 | 11/1990 | Cyr et al. | 379/113 |
| 5,067,074 | 11/1991 | Farel et al. | 379/113 X |
| 5,295,183 | 3/1994 | Langlois et al. | 379/113 |
| 5,425,086 | 6/1995 | Hidaka et al. | 379/113 |

OTHER PUBLICATIONS

Lee et al. "Performance Analysis of Distributed Control Switching System in Traffic Overload Environments," Proceedings of the 1991 Singapore International Conference on Networks Towards Network Globalisation, pp. 352–357.

ITC 12, "Adaptation of the Overload Regulation Method Stator to Multiprocessor Controls and Simulation Results", Torino, Jun 1988, seven pages.

"Two concepts for overload regulation in SPC switching systems: Stator and Tail", by G. Daisenberger, J Oehrlerich and G. Wegmann, eight pages.

"System 12, Traffic Overload Control", by G. Morales Andres and M. Villen Altamirano, *Electrical Communication*, vol. 59, No. 1/2, 1985, pp. 74–79.

*Primary Examiner*—Jeffery Hofsass
*Assistant Examiner*—Daniel S. Hunter
*Attorney, Agent, or Firm*—Merchant, Gould, Smith, Edell, Welter & Schmidt

[57] ABSTRACT

A method for controlling an overload in a hybrid full electronic switching system, capable of maintaining a stable service condition for an overload control interval and realizing a priority control depending on the type of call by sorting an overload occurring in the system into an overload associated with processors adapted to execute services in a centralized manner and an overload associated with processors adapted to execute same services in a distributed manner and thereby automatically calculating numbers of calls to be accepted respectively for control intervals for two kinds of overloads in different control manners. The method includes two different control procedures respectively applied to a case wherein a reduction in overload can be carried out in a processor involving the overload and a case wherein a reduction in overload can be carried out by limiting services to be executed in other processors.

10 Claims, 14 Drawing Sheets

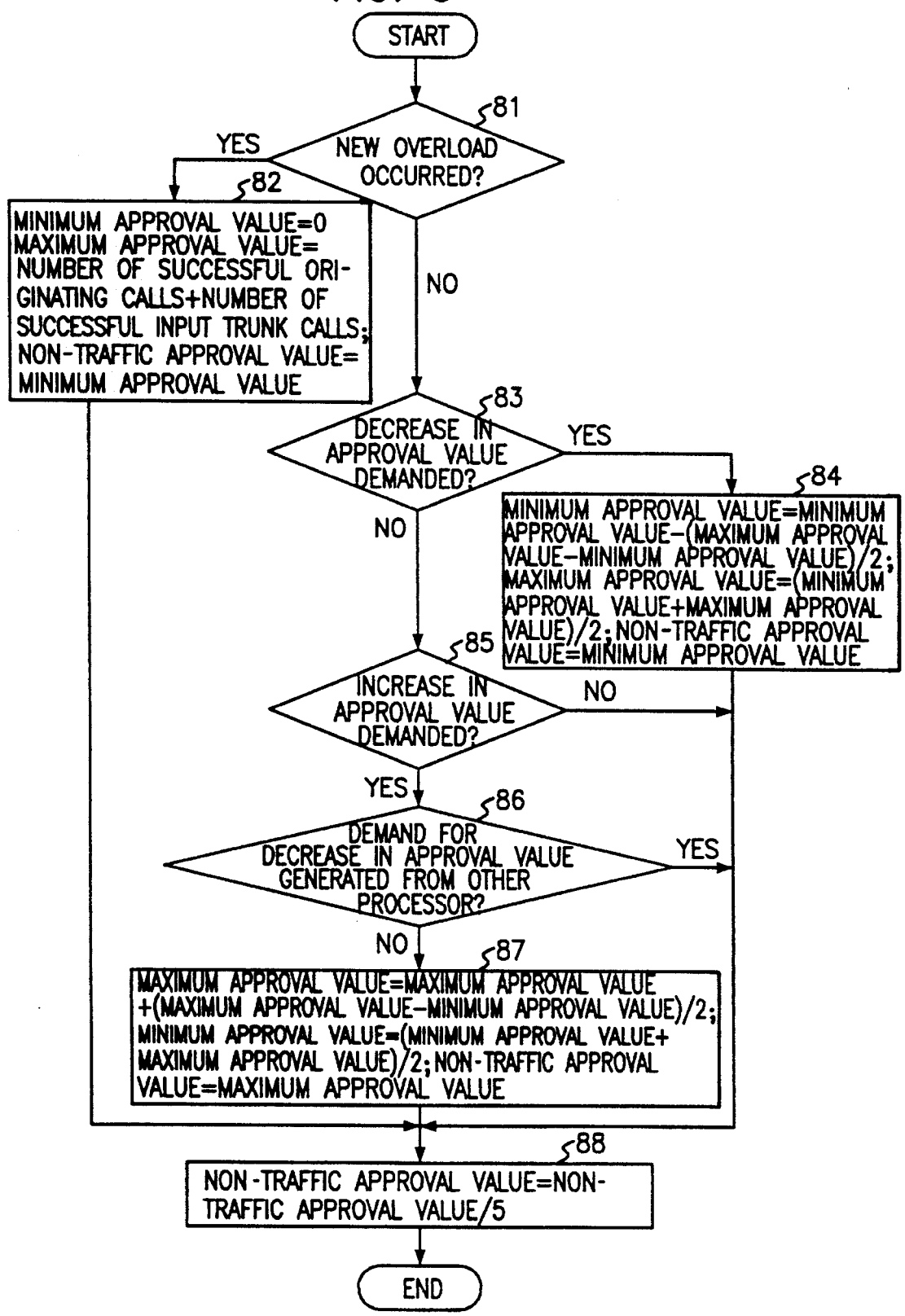

METHOD FOR CONTROLLING OVERLOAD IN CENTRALIZED AND DISTRIBUTED OPERATING HYBRID SWITCHING SYSTEM

BACKGROUND OF THE INVENTION

1. Field of the Invention

The present invention relates to a method for controlling an overload of processors of a centralized and distributed operating hybrid full electronic switching system wherein a part of the functions of the system is processed in a distributed manner, while the other part of the functions is processed in a centralized manner.

2. Description of the Prior Art

Control for an overload is used to continuously provide a stable service while minimizing a failure of service under an overload condition of the processors through a determination about and a control for the overload. Conventional methods of controlling an overload in a switching system are classified into a method for determining the overload of the main processor and a method for controlling the overload of the main processor. As the method for determining the overload of the main processor, there have been known a method using a CPU occupancy rate, a method using a service queue of processors, a method using the number of services required in the processors. In the case of the method using the number of services, a determination that the overload of the main processor has occurred is made when the number of services is not less than a particular critical value. As the method for controlling the overload of the main processor, there have been known a method of determining a call service ratio between call services to be accepted and call services to be suppressed in a control interval, in accordance with the level of the overload, and a method of determining an interval of accepting all call services and an interval of suppressing all call services.

In the case of determining the overload using only the CPU occupancy rate, a determination that the overload has occurred may be made even if nothing interferes with the call processing service. This is because the CPU occupancy rate may be increased due to an operation maintenance software irrespective of the call processing traffic. The erroneous determination results in degradation of service quality.

In the cases of using the length of the service queue of each processor and the number of calls generated, an analysis of sufficient field operating data and a precisely simulated test are required to derive the critical value used for the determination about an overload. Furthermore, these methods have a disadvantage that the derived critical value should be varied depending on the type of call. The disadvantages encountered in the conventional methods of only utilizing the CPU occupancy rate, the service queue and the number of calls generated can be complemented by utilizing both the CPU occupancy rate and the monitoring for the execution delay of the processor.

In the method of controlling the overload, wherein new calls at a next interval are totally suppressed when the CPU occupancy rate is not less than the particular critical value and totally accepted when the CPU occupancy rate is less than the critical value, the control for the overload may be excessive because of an increased width between the increase in service and the decrease in service. On the other hand, the control method wherein the suppression rate is increased as the level of the overload increases has a possibility that an initial control may be failed when an overload occurs due to an abrupt increase in load.

SUMMARY OF THE INVENTION

Therefore, an object of the invention is to solve the above-mentioned problems encountered in the prior art and, thus, to provide a method for controlling an overload of processors of a hybrid full electronic switching system, capable of maintaining a stable service condition for an overload control interval and realizing a priority control, depending on the type of call, by sorting an overload occurring in the system into an overload associated with processors adapted to execute services in a centralized manner and an overload associated with processors adapted to execute the same services in a distributed manner, and thereby automatically calculating numbers of calls to be accepted respectively for control intervals for two kinds of overloads in different control manners.

In order to accomplish this object, in accordance with the present invention, a determination about overload is achieved using a CPU occupancy rate and an execution delay condition of a call processing process. For all processors, the determination about overload is performed in the same manner. Accordingly, it is possible to prevent a temporarily increased processor load caused by an operation and maintenance software from being determined as an overload. The execution delay condition of the call processing process is monitored, thereby preventing a temporary abrupt increase in traffic from being determined as an overload. The overload determined on the basis of the CPU occupancy rate and the delay condition of the call processing process is called "a traffic overload". The operation and maintenance software may have trouble in execution due to the call processing traffic even when the call processing process having priority over the operation and maintenance software is executed normally. Where the operation and maintenance software delays its execution over a predetermined delay time, this delay is considered as having been caused by an overload. This overload is called "a system overload". All controls for traffic and system overloads occurring in the centralized service processors and the distributed service processors are controlled through a suppression of calls. For each control, a control method is used wherein a call approval value indicative of the number of calls to be accepted for a control interval of 2 seconds is calculated so as to execute only services for calls corresponding to the call approval value while suppressing calls generated over the call approval value. The determination about overload is performed in each processor, whereas the overload control is performed in the distributed processor which is the origin of call service. Call approval values associated with overloads of processors are classified into a traffic approval value associated with a traffic overload of a distributed processor being in charge of the control, a non-traffic approval value associated with a system overload of the distributed processor being in charge of the control, and a traffic and a system overload of each of the centralized service processors. The non-traffic approval value is a call approval value resulting from a calculation. A release of overload is carried out when an interval in which no call suppressed has been generated by an overload control is generated three successive times without satisfying a condition considered as the overload condition.

BRIEF DESCRIPTION OF THE DRAWINGS

Other objects and aspects of the invention will become apparent from the following description of embodiments with reference to the accompanying drawings in which:

FIG. 9 is a flow chart illustrating a non-traffic approval value calculation routine in accordance with the present invention;

DETAILED DESCRIPTION OF THE PREFERRED EMBODIMENTS

Figure 1:
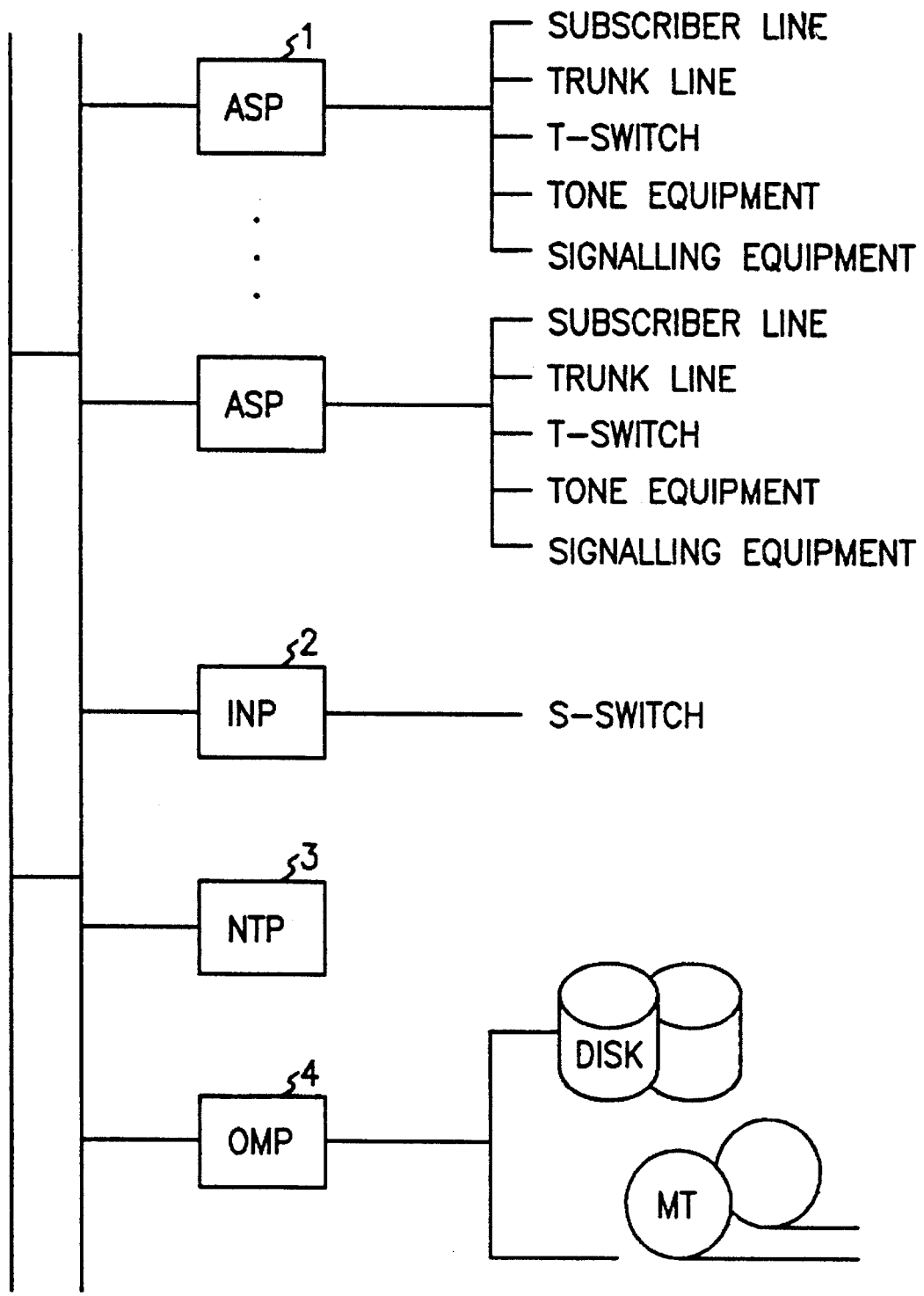
FIG. 1 is a block diagram illustrating a hardware arrangement of a hybrid full electronic switching system to which an overload control in accordance with the present invention is applied.

FIG. 1 is a block diagram illustrating a hardware arrangement of a hybrid full electronic switching system to which an overload control in accordance with the present invention is applied. As shown in FIG. 1, the system includes a plurality of access switching processors (ASPs) 1 distributively operating to sense generation of originating calls on subscriber lines and trunk lines and to perform access of terminating calls, an internal network processor (INP) 2 centrally operating to connect space switches, a number translating processor (NTP) 3 adapted to perform a number translation, and an operation and maintenance processor (OMP) 4 adapted to calculate an accounting and store the calculated accounting. For establishing a call, each of the ASPs 1 is provided with a subscriber line, a trunk line, a signaling equipment, a tone equipment and a time switch. In the INP 2, the space switches are equipped. The OMP 4 includes a magnetic tape driver MK and a hard disk DISK.

Figure 2:
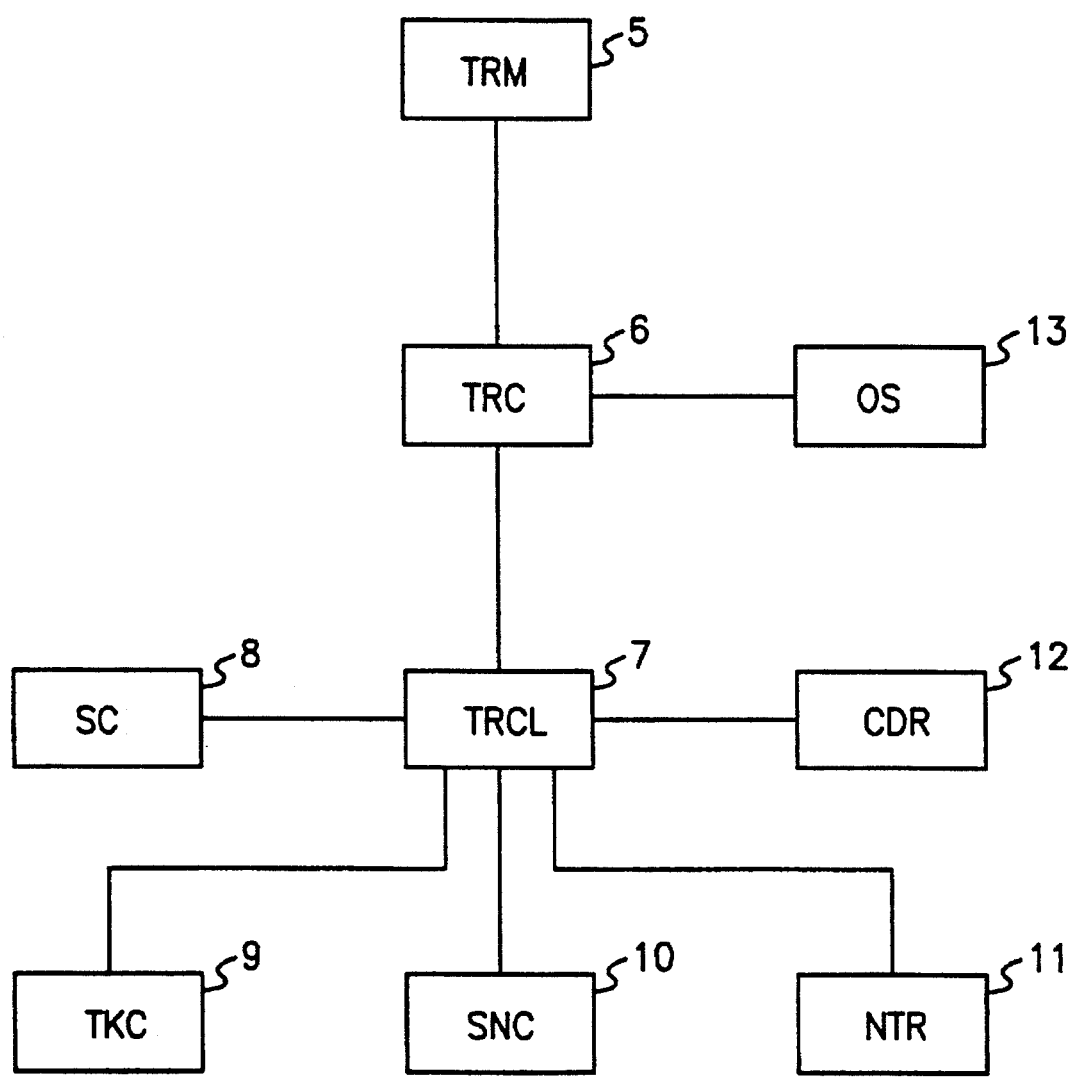
FIG. 2 is a block diagram illustrating a basic software in accordance with the present invention.

FIG. 2 is a block diagram illustrating a basic software in accordance with the present invention. As shown in FIG. 2, the basic software includes a traffic and resource manager software (TRM) 5 loaded in the OMP 4 and adapted to change data about output of an overload condition of each of the processors constituting the switching system and about an overload control; a traffic and resource controller software (TRC) 6 loaded in each of all processors including access switching processors (ASPs) and adapted to execute a determination about and a control for an overload of the processor; a traffic and resource control library software (TRCL) 7 loaded in each of all processors and adapted to interface between a call processing software and an accounting software; a subscriber controller software (SC) 8 loaded in each of the ASPs and adapted to execute a control for originating calls and a control for terminating calls, a trunk controller software (TKC) 9 loaded in each of the ASPs and adapted to execute a control for trunk calls; a switch network controller software (SNC) 10 loaded in the INP 2 and adapted to execute a number translation function, an accounting data recorder software (CDR) 12 loaded in the OMP 4 and adapted to record accounting data; and an operating system software (OS) 13 loaded in each of the processors and adapted to provide a CPU occupancy rate of the processor.

Figure 3:
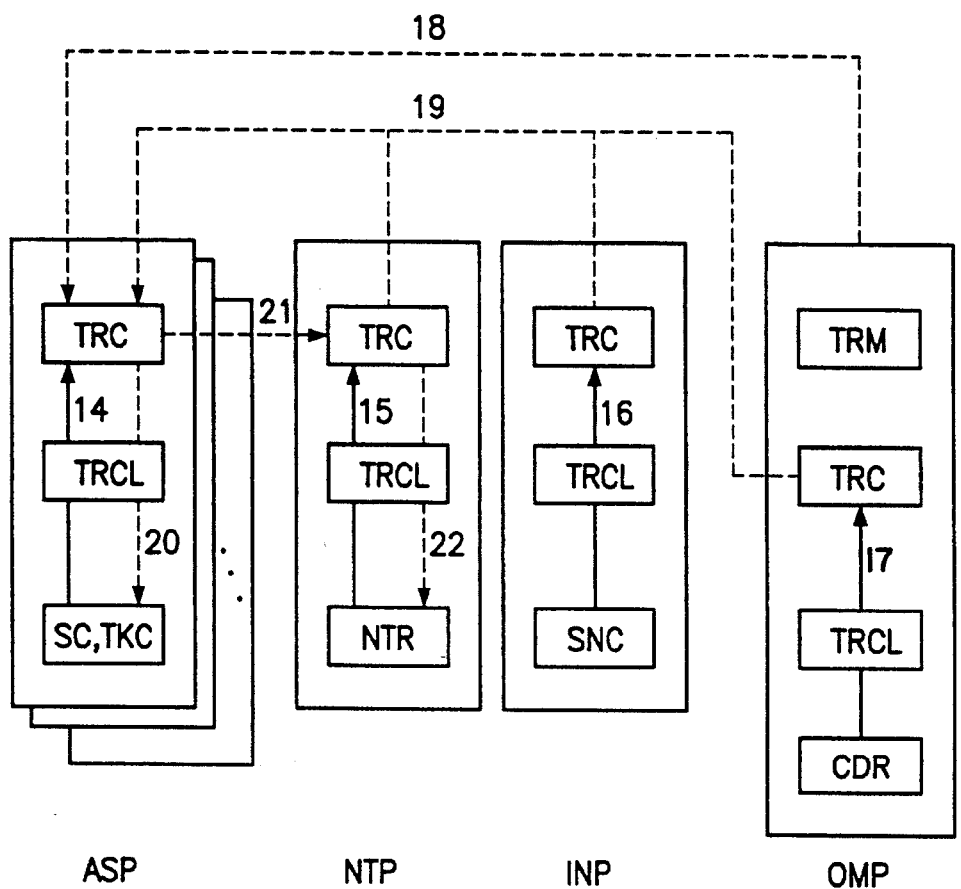
FIG. 3 is a block diagram illustrating various functional relations among processes and softwares for an overload control in the hybrid switching system.

FIG. 3 is a block diagram illustrating various functional relations among processes and softwares for an overload control in the hybrid switching system. In FIG. 3, there are shown a relation 14 for accumulating a call generation count by use of the TRCL when a new call is generated in an ASP and calculating the number of calls generated for a control interval, the number of calls accepted for the control interval and the number of calls suppressed for the control interval by the TRC using the TRCL; a relation 15 for accumulating a number translation count by use of the TRCL when a number translator of the NTP executes a number translation and calculating a number translation statistic for the control interval by the TRC using the TRCL at predetermined intervals; a relation 16 for accumulating a space switch demand count by the SNC loaded in the INP and by use of the TRCL and calculating a switch statistic for the control interval by the TRC loaded in the INP and by use of the TRCL at predetermined intervals; and a relation 17 for accumulating an accounting count by use of the TRCL when an accounting record demand is generated and calculating an accounting statistic for the control interval by the TRC loaded in the OMP at predetermined intervals. The relations 14 to 17 express a relation for collecting a processor overload to be output from each processor.

In FIG. 3, there are also shown a relation 18 for demanding a call suppression by the TRM loaded in the OMP in response to an operator command and executing the call suppression by the TRC loaded in the ASP; a relation 19 for demanding a call suppression when each processor is determined to be under an overload condition and executing the call suppression by the TRC loaded in the ASP in response to the demand for call suppression; a relation 20 for executing a suppression of originating calls and input trunk calls by the TRC loaded in the ASP and by use of the TRCL when an overload of the ASP occurs, when a demand for call suppression is generated from the TRM, or when a demand for call suppression is generated due to overloads of the OMP, INP and NTP, and making an inquiry about a call approval by the SC and TKC respectively upon generation of originating calls and generation of input trunk calls; a relation 21 for demanding a suppression of terminating and output trunk calls of the TRC loaded in the NTP when the TRC loaded in the ASP receives the demand for the suppression of terminating and output trunk calls from the TRM or when a terminating call control is required for an overload control for the ASP being executed by the TRC; and a relation 22 for executing a call suppression by use of the TRCL when the TRC loaded in the NTP receives the demand for the suppression of terminating and output trunk calls, and making, by the NTR, an inquiry about an approval for terminating and output trunk calls of the ASP which is to execute a terminating and output trunk call service after completion of the number translation. The relations 18 to 22 express a relation between each processor and each associated software for the call control.

Figure 4:
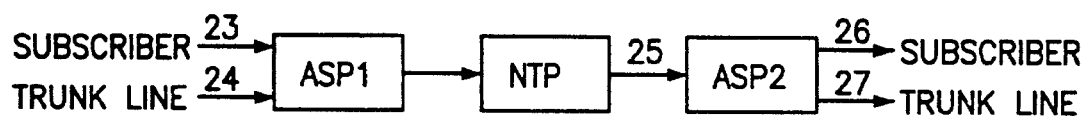
FIG. 4 is a block diagram illustrating a call sort employed in the hybrid switching system and call control functions executed under an overload condition in accordance with the present invention.

FIG. 4 is a block diagram illustrating a call sort employed in the hybrid switching system and call control functions executed under an overload condition in accordance with the present invention. The call sort is achieved directly in a position of each ASP. A call newly generated from a subscriber and directly sensed by an optional ASP (ASP1) is sorted as an originating call, while the new call sensed by the ASP (ASP1) via an input trunk line is sorted as an input trunk call. In FIG. 4, the originating call is denoted by the reference numeral 23, while the input trunk call is denoted by the reference numeral 24. When the originating call or the input trunk call is generated, the ASP (ASP1) demands a number translation of the NTP. After completing the number translation, the NTP selects an appropriate ASP (ASP2) to be connected with a switch and demands a call terminating of the ASP (ASP2), as indicated by an arrow 25 in FIG. 4. In a position of the selected ASP (ASP2), a call transmitted to another subscriber is sorted as a terminating call, while a call transmitted to another switching office via a trunk line is sorted as an output trunk call. In FIG. 4, the terminating call is denoted by the reference numeral 26, while the output trunk call is denoted by the reference numeral 27. An originating ASP may be identical to a terminating ASP. A call suppression upon an occurrence of an overload is executed by an ASP associated with the overload in the case of originating calls and by the NTP in the case of terminating calls. A call control is carried out in accordance with a priority established by a sort into three kinds of calls, that is, in the order of originating call, input trunk call, and terminating and output trunk calls. The terminating call and the output trunk call have the same service priority without any distinction. In a calculation of an approval value, the terminating call and the output trunk call are employed together without any distinction.

Figure 5:
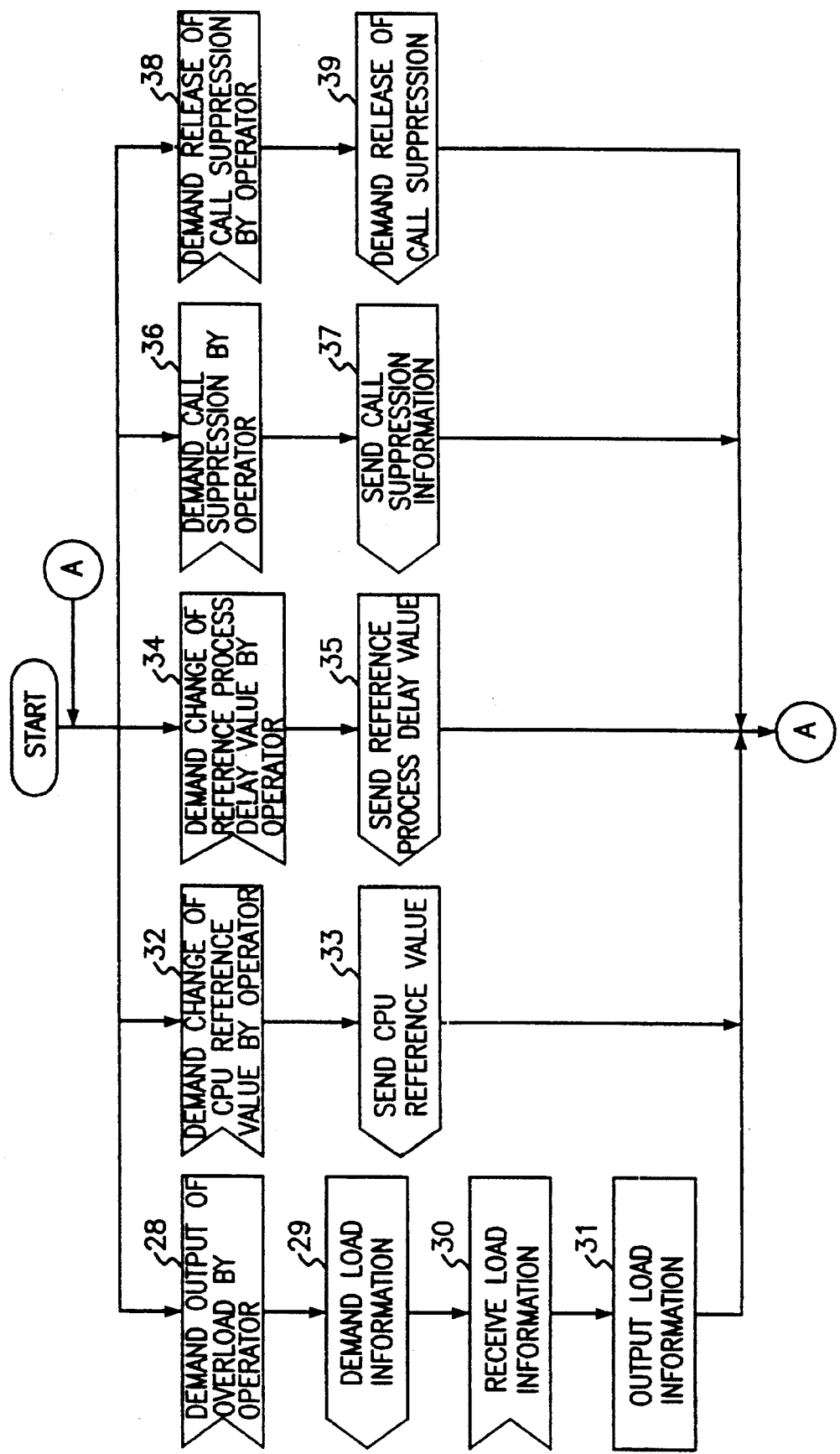
FIG. 5 is a flow chart illustrating a traffic and resource manager software adapted to execute a function of changing data about output of an overload condition and about an overload control in accordance with the present invention.

FIG. 5 is a flow chart illustrating the TRM adapted to execute a function of changing data about output of an overload condition and about an overload control.

Once the TRM is loaded into the OMP, it is repeatedly executed infinite times to receive an operator command and execute a function based on the operator command. Where the received command is a command for demanding an output of an overload condition (Step 28), the TRM sends a demand for output of overload condition to the TRC (Step 29). Thereafter, the TRM receives a load information from the TRC (Step 30) and then sends it to an operator (Step 31). Where the received command is a command for changing a CPU reference value (Step 32), the TRM sends the CPU reference value to the TRC so that the CPU reference value is used for a determination about a traffic overload (Step 33). Where the received command is a command for changing a reference process delay value (Step 34), the TRM sends the reference process delay value to the TRC so that the reference process delay value is used for a determination about a system overload (Step 35). Where the received command is a command for demanding for a call suppression (Step 36), the TRM sends a suppression information to the TRC so as to generate an operator overload and execute a function of controlling the overload by the operator (Step 37). On the other hand, where the received command is a command for releasing a call suppression (Step 38), the TRM sends a demand for release of call suppression to the TRC so as to stop the overload control function being executed by the operator overload (Step 39).

Figure 6:
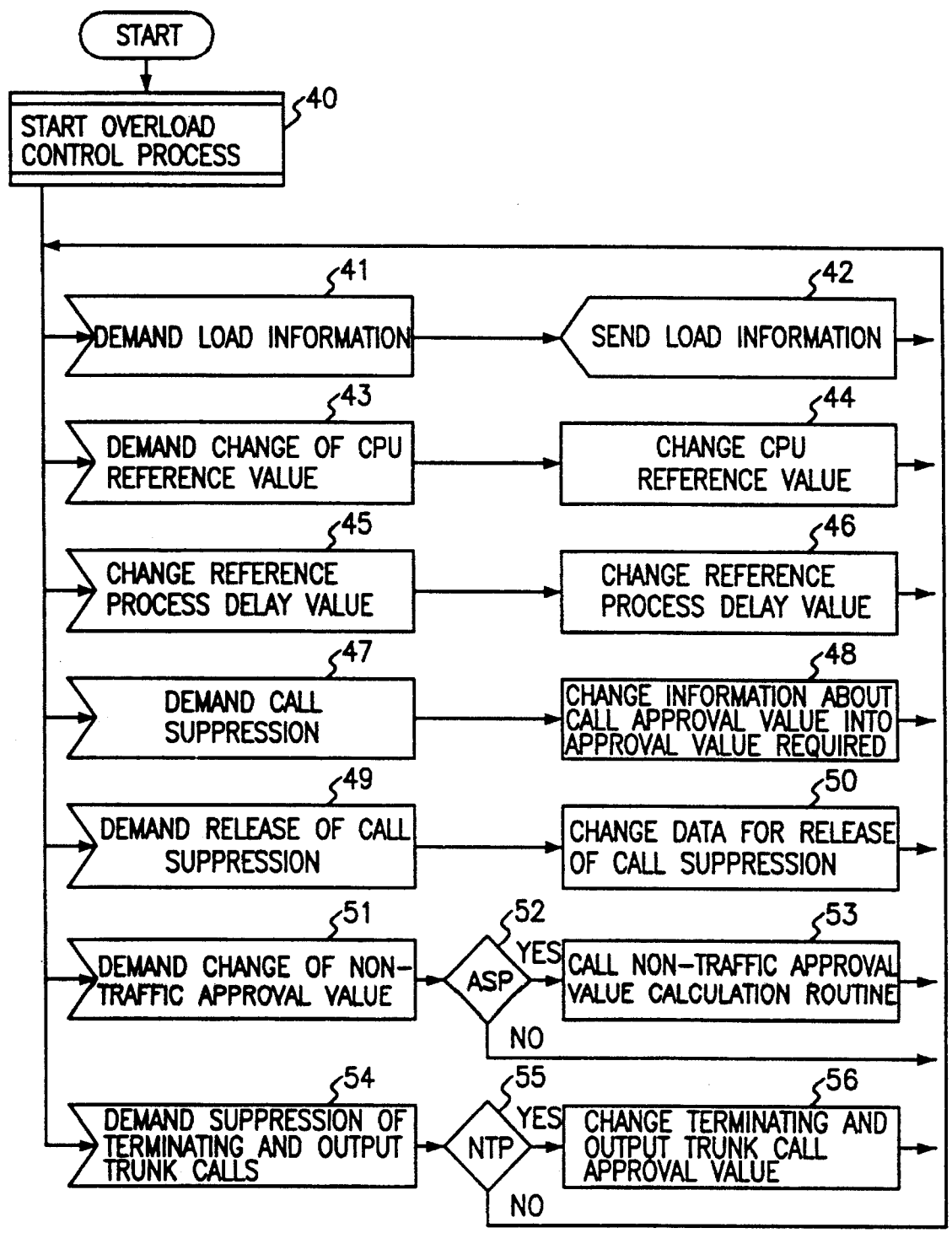
FIG. 6 is a flow chart illustrating the traffic and resource controller software loaded in each processor and adapted to execute a determination about and a control for overload.

FIG. 6 is a flow chart illustrating the TRC loaded in each processor and adapted to execute a determination about and a control for overload.

Once the TRC starts, it serves initially to start an overload control process for controlling an overload (Step 40). Thereafter, the TRC is repeatedly executed infinite times in response to information associated with the overload control received from the TRM and another TRC loaded in another processor. Upon receiving a demand for load information from the TRM (Step 41), the TRC sends a load information to the TRM so that the load information is sent to an operator (Step 42). Where the TRC receives a demand for a change of the CPU reference value from the TRM (Step 43), it changes the CPU reference value so that the changed CPU reference value is used for a traffic overload control (Step 44). Upon receiving a demand for a change of the reference process delay value from the TRM (Step 45), it changes the reference process delay value so that the changed reference process delay value is used for a system overload control (Step 46). Reference process delay values are sorted in the order of four priorities of 0, 1, 2, and 3. The call processing process has the priority of 1. The operation and maintenance process has the priority of 0, whereas the overload control process has the priority of 3. Where the TRC receives a call suppression signal from the TRM for demanding a call suppression of the ASP (Step 47), it changes an originating call approval value, an input trunk call approval value and a terminating and output trunk call approval value respectively into values meeting an operator's demand and then executes a call control for a control interval of 2 seconds on the basis of the changed approval values (Step 48). Upon receiving a demand for a release of call suppression from the TRM (Step 49), the TRC changes data about approval values so as to stop the call suppression by the operator (Step 50). As mentioned hereinbefore, an approval value calculated in the ASP in association with an overload of each processor executing a centralized service and a system overload in addition to a traffic overload of the ASP is called "a non-traffic approval value". When a demand for a change of such a non-traffic approval value is generated from a TRC of another processor (Step 51), a determination is made about whether the demand signal is received in the ASP (Step 52). Where the ASP receives the demand signal, a non-traffic approval value calculation routine is called so as to calculate a new non-traffic approval value (Step 53). The non-traffic approval value is used to control an overload condition of a processor other than the ASP and a system overload condition of the ASP. Terminating and output trunk calls are limited only under a traffic overload condition of the ASP and under a condition that a control of the operator is executed. Control for the terminating and output trunk calls is executed by the TRC and number translator of the NTP. When a demand for a suppression of terminating and output trunk calls is generated from the TRC of the ASP (Step 54), a determination is made about whether the demand is received in the NTP (Step 55). Where the NTP receives the demand, the terminating and output trunk call approval value of the ASP is changed so as to achieve a terminating call control of the ASP (Step 56).

Figure 7:
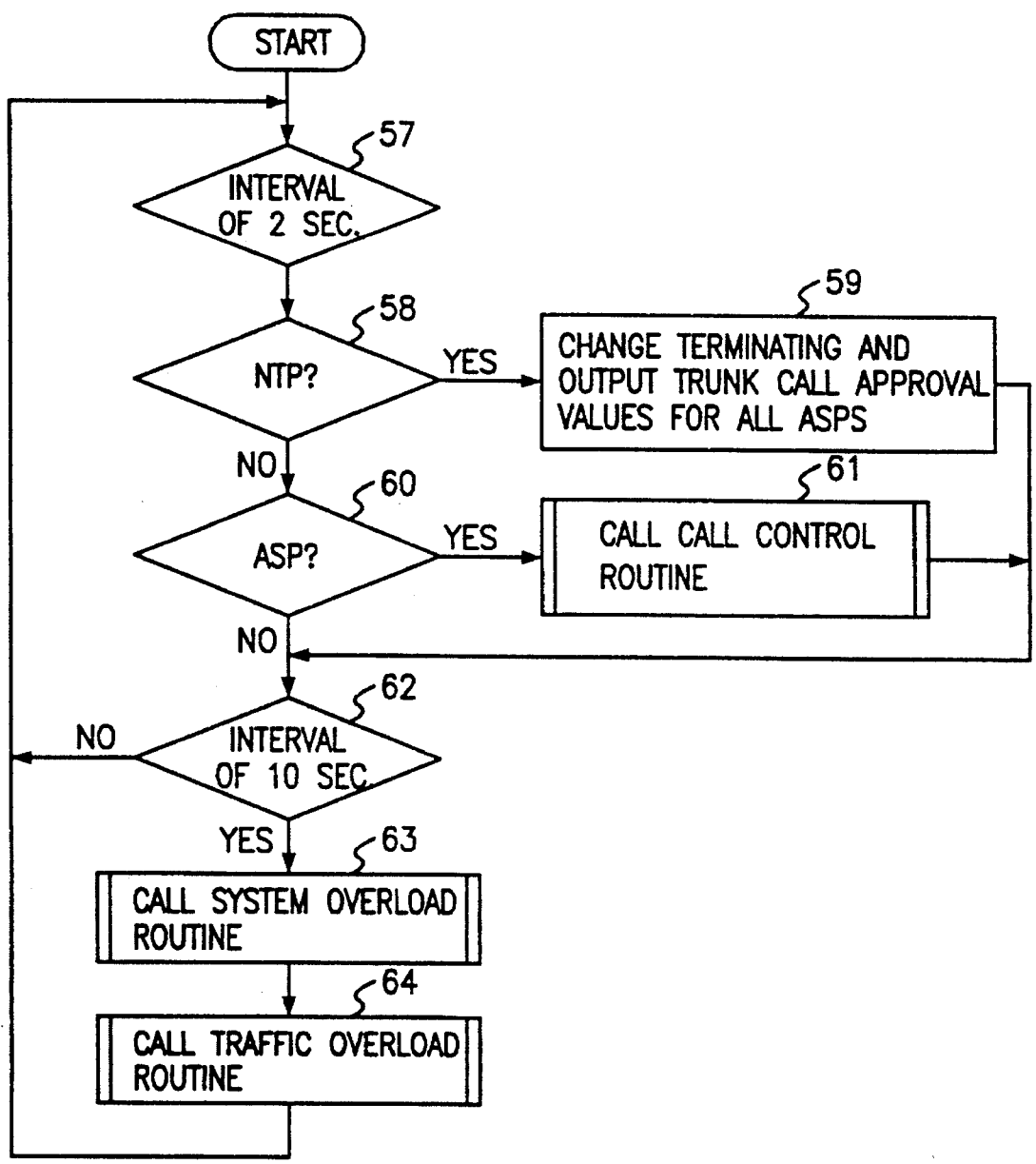
FIG. 7 is a flow chart illustrating a overload control process of the traffic and resource controller software adapted to determine and control an overload of the processor in which the traffic and resource controller software is loaded.

FIG. 7 is a flow chart illustrating the overload control process of the TRC adapted to determine and control an overload of the processor in which the TRC is loaded.

The overload control process is begun when the TRC starts. The overload control process is repeatedly executed infinite times at intervals of 2 seconds (Step 57). Where the processor loaded with the TRC is the NTP (Step 58), a checking is made about whether all ASPs are required to be under a terminating call control. If the terminating call control is required, a TRCL routine loaded in the NTP is called to send a terminating and output trunk call approval value to the TRCL and thereby control terminating and output trunk calls at intervals of 2 seconds on the basis of the terminating and output trunk call approval value (Step 59). Where the processor loaded with the TRC is the ASP (Step 60), a call control routine for executing a call control for all overload conditions is called to calculate a call approval value and execute a call control on the basis of the calculated call approval value (Step 61). After the execution of the overload control process of the TRC is continued for an interval of 10 seconds (Step 62), a system overload processing routine for determining a system overload is executed (Step 63). Subsequently, a traffic overload routine is executed (Step 64).

Figure 8A:
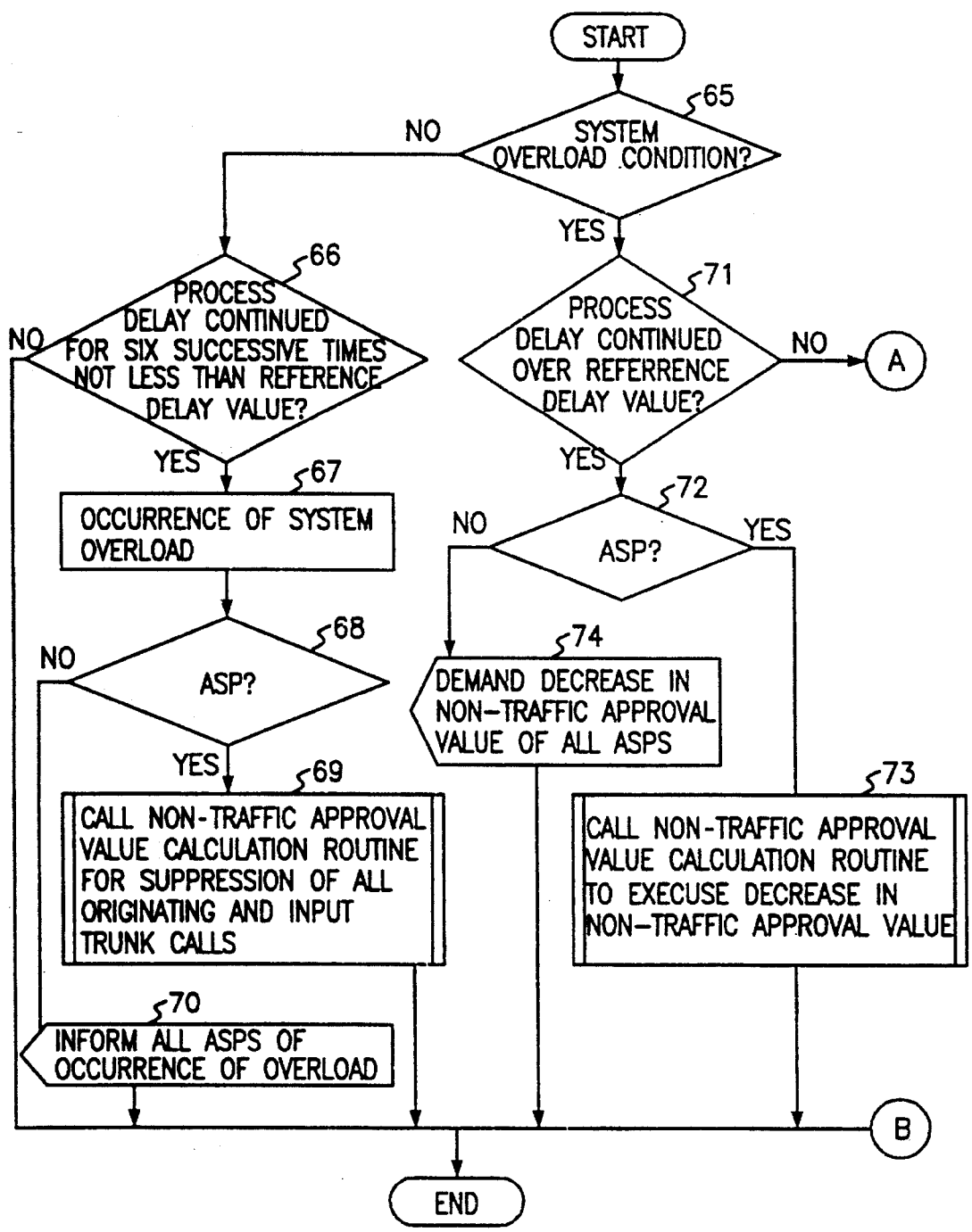
FIGS. 8A and 8B are flow charts respectively illustrating a system overload processing routine in accordance with the present invention.
Figure 8B:
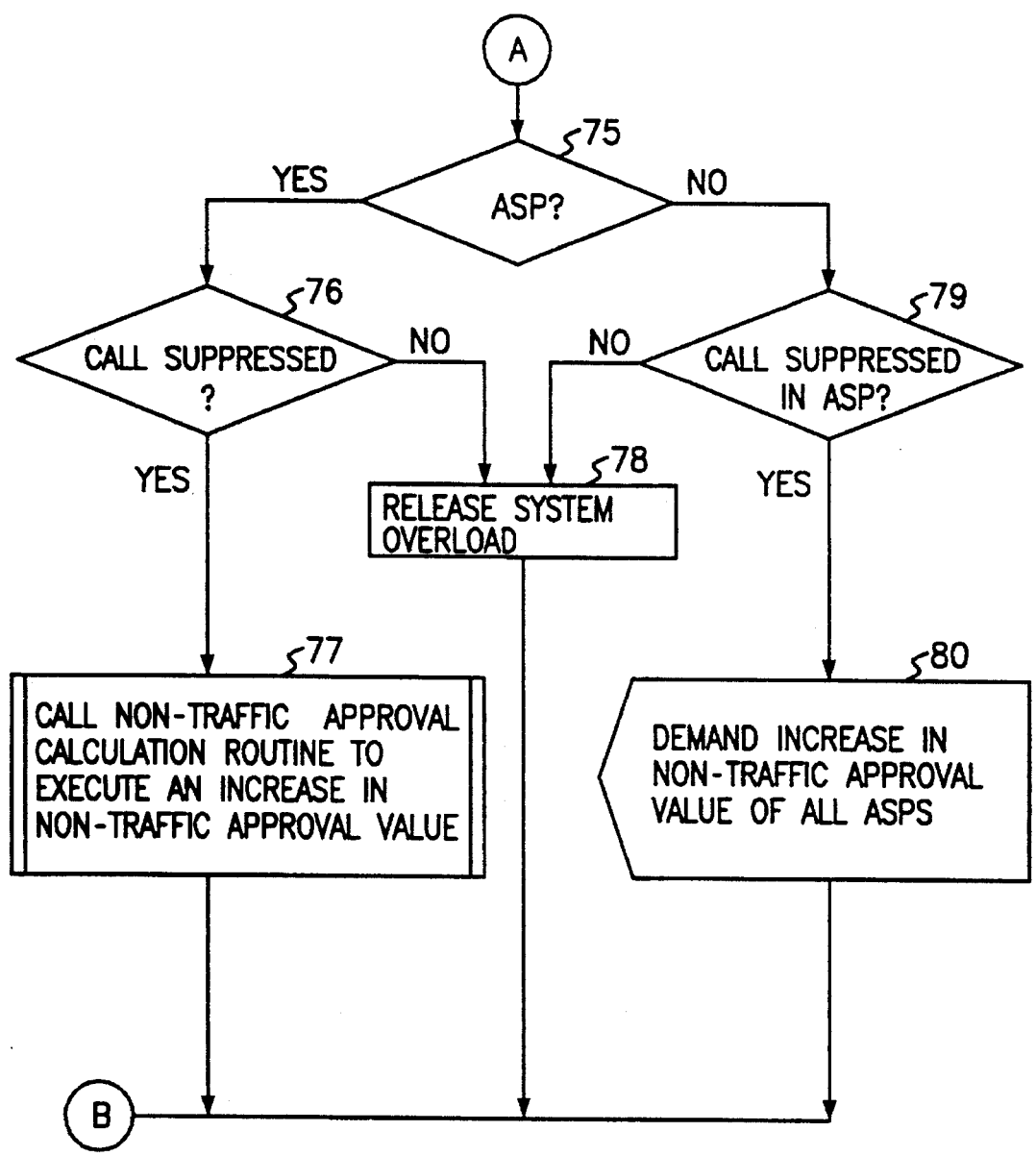

FIGS. 8A and 8B are flow charts respectively illustrating the system overload processing routine in accordance with the present invention.

The overload control process calls the system overload processing routine at intervals of 10 seconds. Upon being called, the system overload processing routine determines a system overload using delay times of processes respectively having priorities sorted in the order of priorities of 0, 1, 2 and 3 established by a process scheduling priority control executed by an operating system. First, a determination is made about whether a system overload has occurred (Step 65). When no system overload has occurred, a determination is made about whether the process delay has been continued for six successive times not less than a reference delay value predetermined by an operator (Step 66). This determination is executed in the order of established process priorities. When the process delay has been continued for six successive times, a determination is made that a system overload has occurred (Step 67). Thereafter, a determination is made about whether the system overload has occurred in the ASP (Step 68). Where the system overload has occurred in the ASP, a non-traffic approval value calculation routine is called to execute a suppression for all originating and input trunk calls (Step 69). Where the system overload has occurred in a processor other than the ASP, the occurrence of overload is reported to all ASPs. Since the level of an overload newly generated can not be known, all calls are suppressed until an appropriate approval value is calculated. Where the process delay has been continued for certain successive times not less than the reference delay value under a condition that the system overload has already occurred (Step 71), a determination is then made about whether the system overload has occurred in the ASP (Step 72). Where the system overload has occurred in the ASP, the non-traffic approval value calculation routine is called to execute a decrease in non-traffic approval value (Step 73). Where the system overload has occurred in a processor other than the ASP, a demand for a decrease in non-traffic approval value is sent to all ASPs (Step 74). When the number of process delay times has been determined at Step 71 to be less than the reference delay value, a determination is then made about whether the system overload has occurred in the ASP (Step 75). Where the system overload has occurred in the ASP, a check is made about whether any originating and input trunk calls have been suppressed for a current interval (Step 76). If there are originating and input trunk calls suppressed, the non-traffic approval calculation routine is called to execute an increase in non-traffic approval value (Step 77). If there is no call suppressed, the system overload is released (Step 78). Where the system overload has occurred in a processor other than the ASP under the condition that the number of process delay times is less than the reference delay value, a check is made about whether any call has been suppressed in the ASP (Step 79). If there is at least one call suppressed, a demand for an increase in non-traffic approval value is sent to all ASPs (Step 80). If there is no call suppressed, the system overload is released (Step 78).

FIG. 9 is a flow chart illustrating the non-traffic approval value calculation routine in accordance with the present invention.

The non-traffic approval value calculation routine is a sub-routine of the TRC loaded in the ASP. This routine is called under the system overload condition of the associated ASP (Steps 69, 73 and 77) and the traffic and system overload conditions of the OMP, NTP and INP (Steps 53, 70, 74, 80, 95, 100 and 101) to calculate a non-traffic approval value required for a calculation of a call approval value to be controlled under the overload condition.

Once the non-traffic approval value calculation routine starts, a determination is made about whether a new overload has occurred (Step 81). When a new system overload has occurred in the ASP or when a new traffic or system overload has occurred in the OMP, INP or NTP, a minimum approval value is set at zero while a maximum approval value is set at a value derived by summing the number of successful originating calls and the number of successful input trunk calls respectively generated for 10 seconds (Step 82). At the step 82, a non-traffic approval value is also set at the minimum approval value. Thereafter, a determination is made about whether a demand for a decrease in approval value has been made (Step 83). Where the non-traffic approval value calculation routine has been called due to the demand for the decrease in approval value, a minimum approval value is calculated by deducting a value resulting from a division of the difference between previous minimum and maximum approval values by 2 from the previous minimum approval value (Step 84). At the step 84, a maximum approval value is then calculated by dividing the difference between the newly calculated minimum approval value and the previous maximum approval value by 2. Also, a non-traffic approval value is set at the minimum approval value. Where the non-traffic approval value calculation routine has been called due to a demand for an increase in approval value (Step 85), a check is made about whether a demand for a decrease in approval value has been generated from another processor (Step 86). Where no demand for the decrease in approval value has been generated, a maximum approval value is calculated by adding a value resulting from a division of the difference between the previous minimum and maximum approval values by 2 to the previous maximum approval value (Step 87). At the step 87, a minimum approval value is then calculated by dividing the difference between the previous minimum approval value and the newly calculated maximum approval value by 2. Also, a non-traffic approval value is set at the maximum approval value. Since the non-traffic approval value is calculated using data generated for the interval of 10 seconds, a non-traffic approval value to be used in a control at intervals of 2 seconds is finally derived by dividing the non-traffic approval value for the interval of 10 seconds by 5 (Step 88).

Figure 10A:
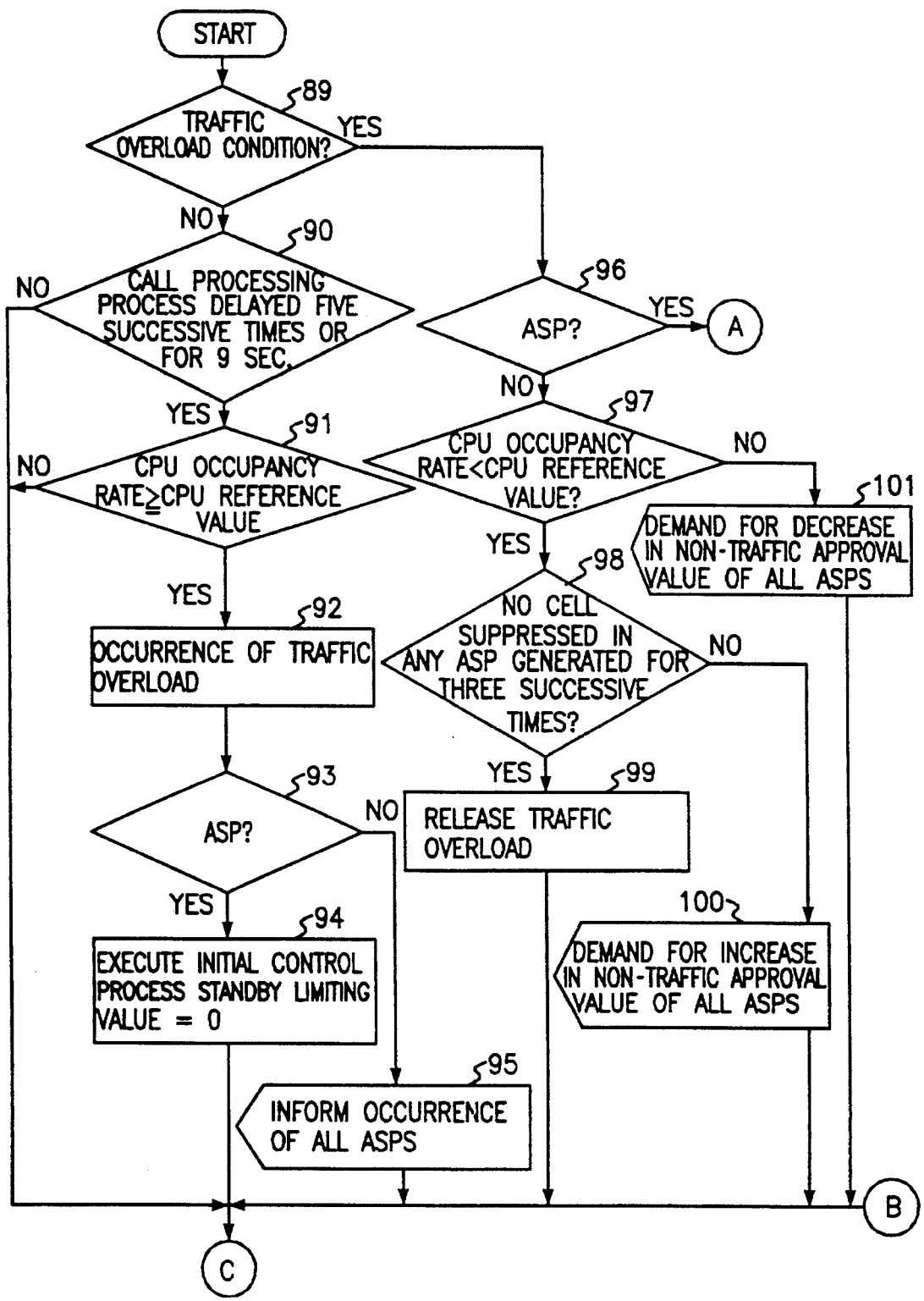
FIGS. 10A to 10C are flow charts respectively illustrating a traffic overload processing routine in accordance with the present invention.
Figure 10B:
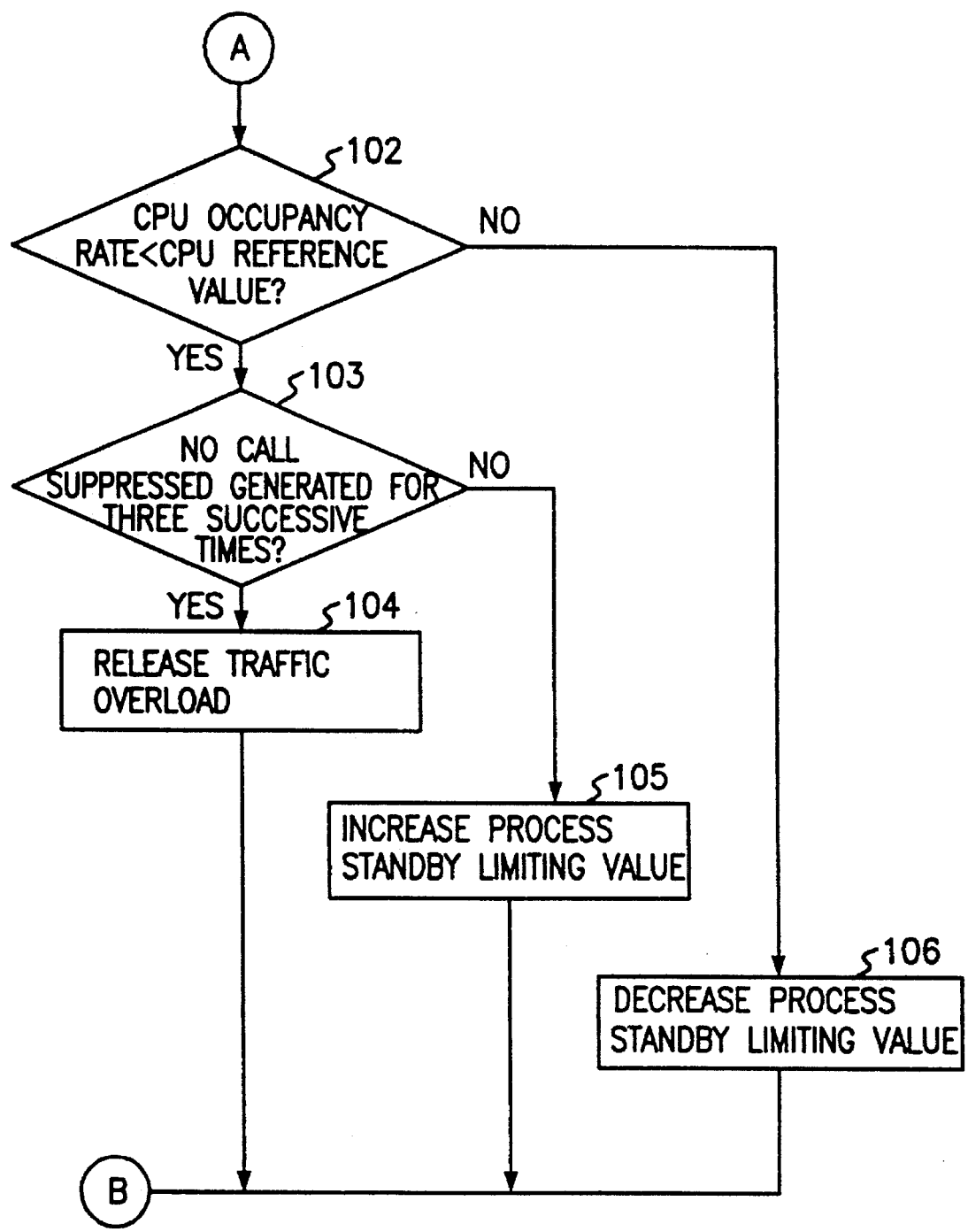
Figure 10C:
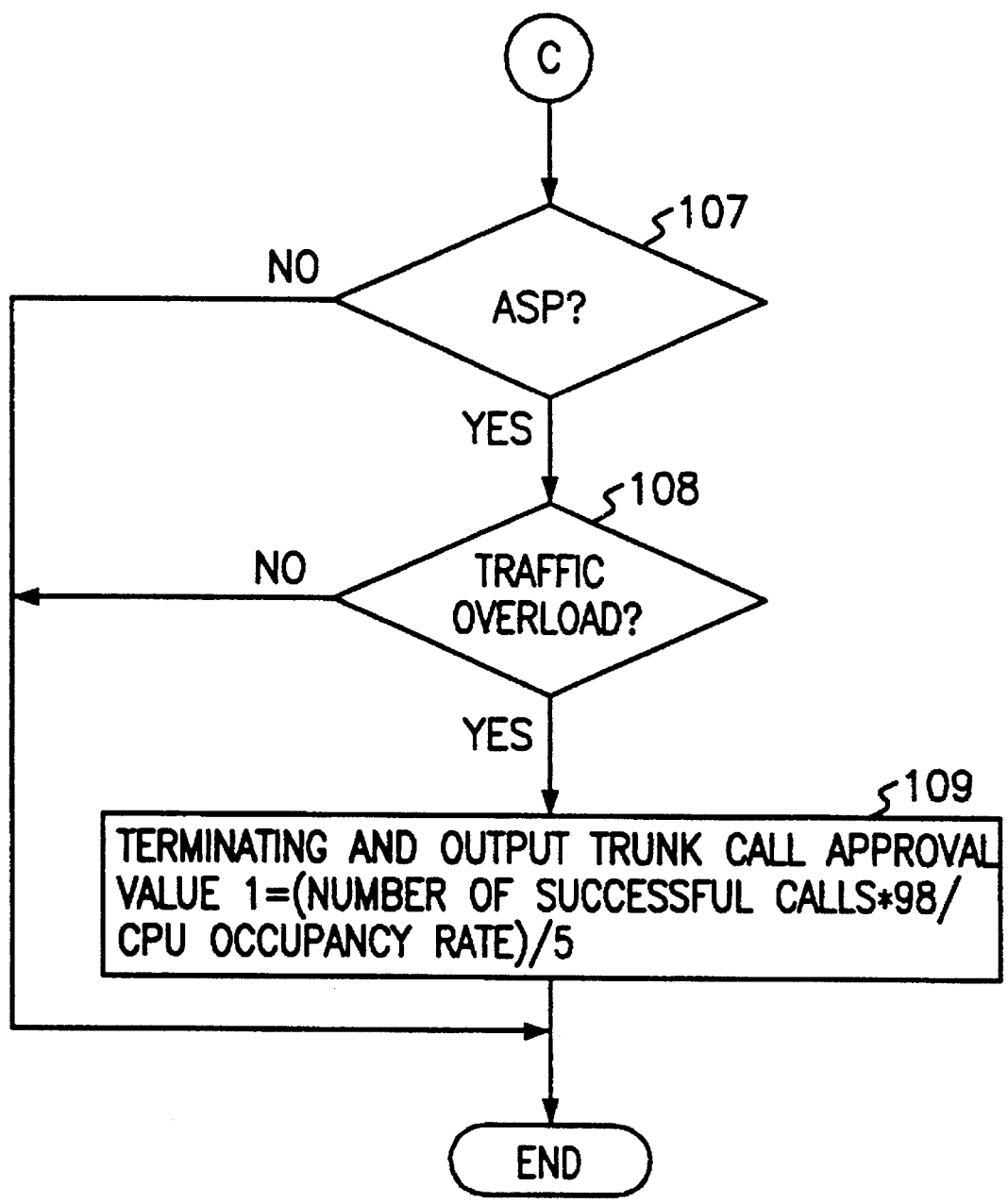

FIGS. 10A to 10C are flow charts respectively illustrating a traffic overload processing routine in accordance with the present invention.

The traffic overload processing routine is a sub-routine of the TRC. The overload control process calls the traffic overload processing routine at intervals of 10 seconds. The traffic overload processing routine is loaded in all processors to change data about an overload determination and an overload control. Once the traffic overload processing routine starts, a determination is made whether a traffic overload has occurred (Step 89). Under a normal condition other than the overload condition, a determination is then made about whether the call processing process has delayed five successive times or for 9 seconds (Step 90). For the determination, the delay of the call processing process is monitored at intervals of 2 seconds. Under a condition that the call processing process has delayed five successive times or for 9 seconds, a determination is made about whether a CPU occupancy rate is not less than a CPU reference value (Step 91). If the CPU occupancy rate is not less than the CPU reference value, a determination is then made that a traffic overload has occurred (Step 92). Where the traffic overload has occurred in the ASP (Step 93), an execution of an initial control is displayed (Step 94). At Step 94, a process standby limiting value is initialized. The process standby limiting value is used for a determination about whether an appropriate control is being executed and as a reference value for the control. Where the traffic overload has occurred in a processor other than the ASP, the occurrence of overload is reported to all ASPs so as to achieve an overload control by the ASPs (Step 95). Where a determination that the traffic overload has occurred is made at Step 89, a determination is then made about whether the traffic overload has occurred in the ASP (Step 96). If the traffic overload has occurred in a processor other than the ASP, a determination is then made about whether a CPU occupancy rate is less than a CPU reference value (Step 97). When the CPU occupancy rate is less than the CPU reference value, a check is made about whether no call suppressed in any ASP has been generated for three successive times (Step 98). Where no call suppressed in any ASP has been generated for three successive times, the traffic overload is released (Step 99). When at least one call suppressed has been generated within three successive times under the condition that the CPU occupancy rate is less than the CPU reference value and that the traffic overload has occurred in a processor other than the ASP, a demand for an increase in non-traffic approval value is sent to all ASPs (Step 100). When the CPU occupancy rate is not less than the CPU reference value under the condition that the traffic overload has occurred in a processor other than the ASP, a demand for a decrease in non-traffic approval value is sent to all ASPs (Step 101). When a determination that the traffic overload has occurred in the ASP is made at Step 96, a determination is then made about whether a CPU occupancy rate is less than a CPU reference value (Step 102). When the CPU occupancy rate is less than the CPU reference value, a check is made about whether no call suppressed in any ASP has been generated for three successive times (Step 103). Where no call suppressed in any ASP has been generated for three successive times, the traffic overload is released (Step 104). When at least one call suppressed has been generated within three successive times, an increase in process standby limiting value is executed so as to achieve an increase in call approval value Step (105). Where a determination is made at Step 102 that the CPU occupancy rate is not less than the CPU reference value, a decrease in process standby limiting value is executed so as to achieve a decrease in call approval value Step (106). Thereafter, a determination is made about whether the traffic overload processing routine is being executed in the ASP (Step 107). Where the traffic overload processing routine is being executed in the ASP, a check is then made about whether a traffic overload has occurred (Step 108). Under the traffic overload condition, a call approval value required for a suppression of terminating and output trunk calls is calculated Step (109). The call approval value is calculated by adjusting the number of successful calls by use of a relation between the number of successful calls for 10 seconds and the CPU occupancy rate such that the current CPU occupancy rate is increased up to 98% and then dividing the adjusted number of successful calls by 5.

Figure 11A:
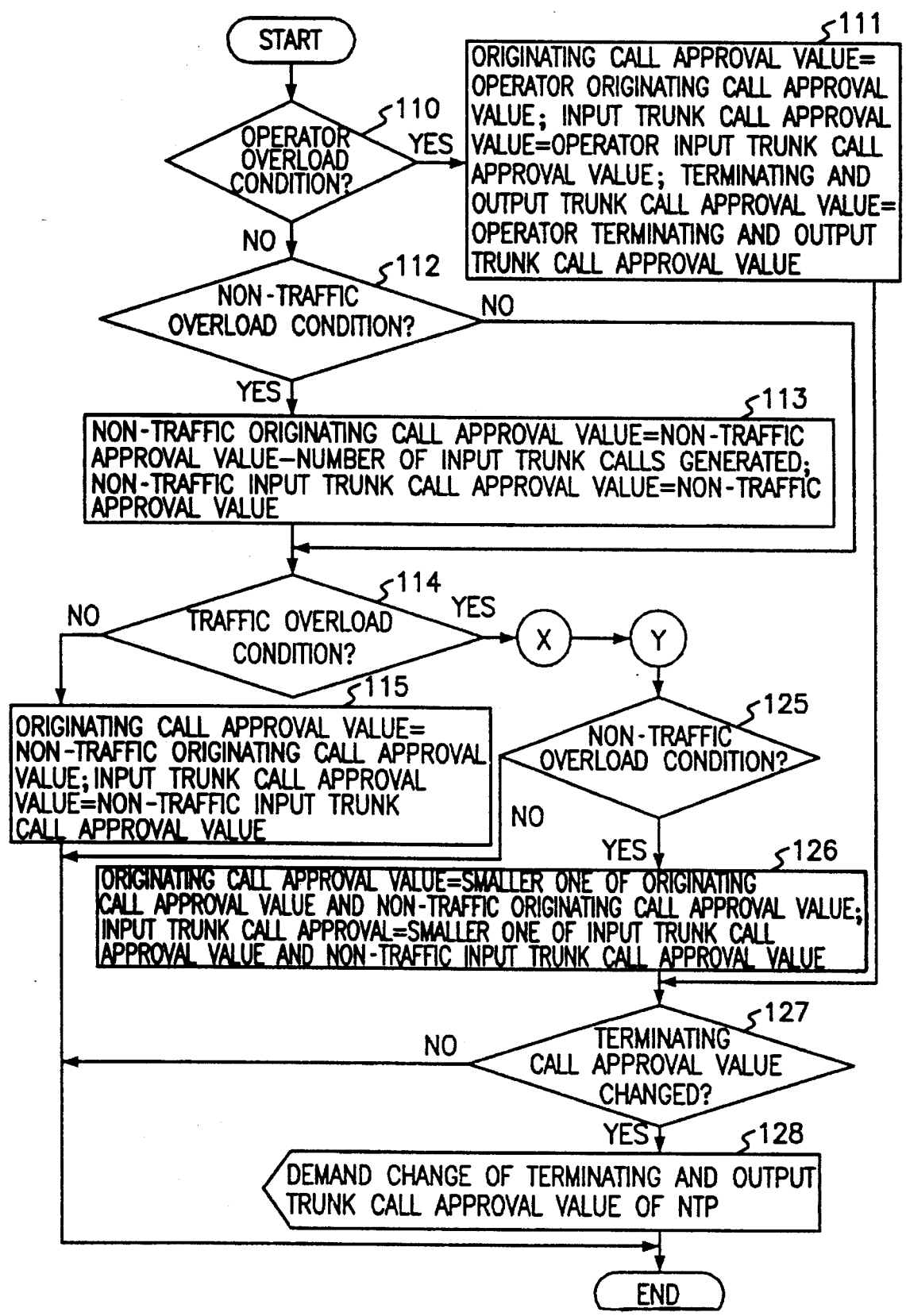
FIGS. 11A and 11B are flow charts respectively illustrating a call control routine of the traffic and resource controller software loaded in an access switching processor in accordance with the present invention.
Figure 11B:
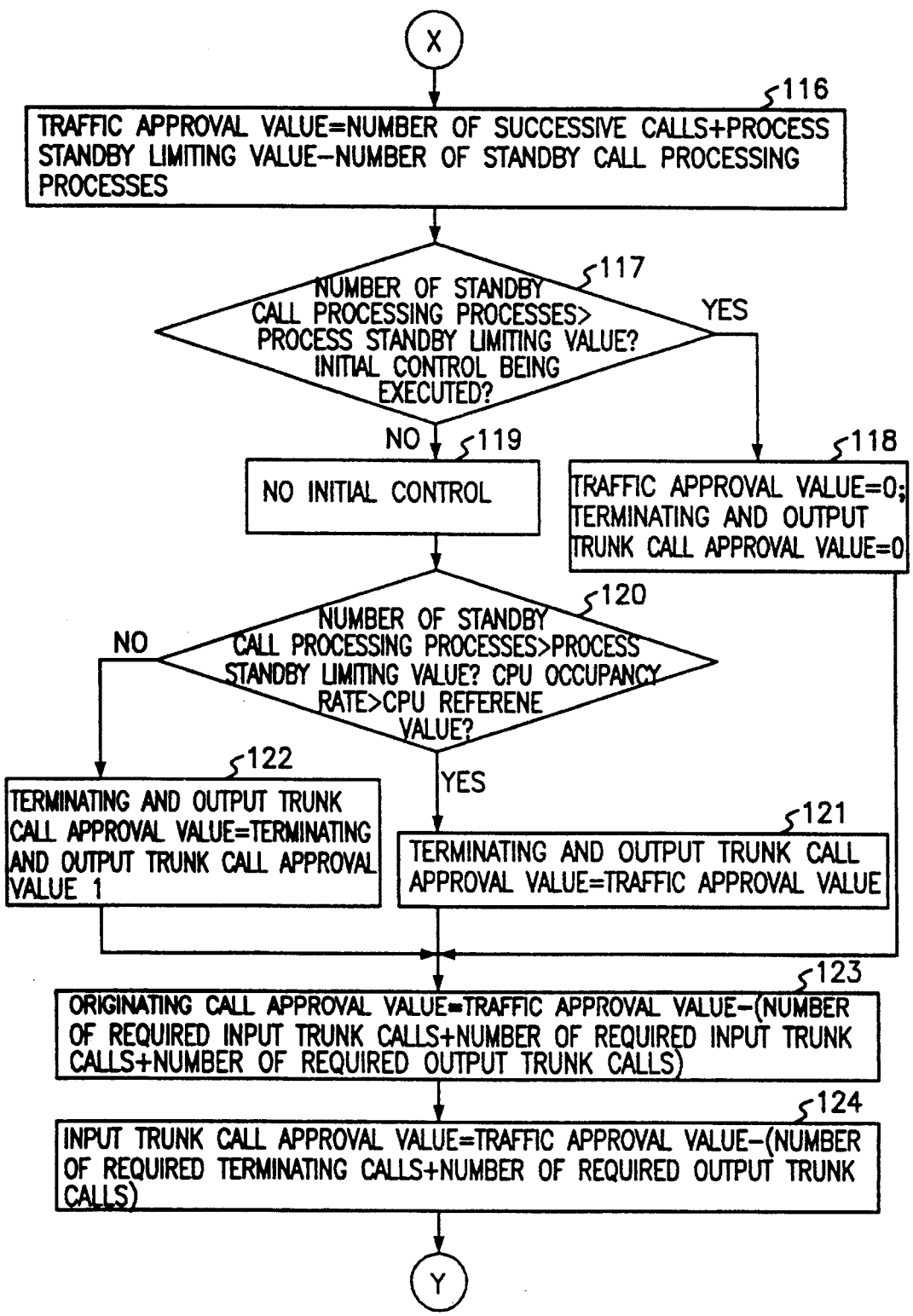

FIGS. 11A and 11B are flow charts respectively illustrating the call control routine of the TRC loaded in the ASP.

The call control routine is adapted to calculate appropriate approval values under a condition that a call suppression is to be executed in the ASP. The overload control process calls the call control routine at intervals of 2 seconds. Once the call control routine starts, a determination is made about whether an operator overload condition has occurred (Step 110). Where the operator overload condition has occurred due to a demand for a call suppression based on a command from the TRM, call approval values required by the command are set by call control approval values, respectively (Step 111). That is, an originating call approval value is set by an operator originating call approval value. An input trunk call approval value is set by an operator input trunk call approval value. Also, a terminating and output trunk call approval value is set by an operator terminating and output trunk call approval value. Where no operator overload condition has occurred, that is, where no call suppression based on any command has been required, a determination is then made about whether a non-traffic overload condition has occurred (Step 112). When a demand for a control is sent to the ASP due to an overload of the OMP, NTP or INP or a system overload of the ASP, a non-traffic originating call approval value is set at a value resulting from a deduction of the number of required input trunk calls generated for an interval of 2 seconds from the non-traffic approval value Step (113). At Step 113, a non-traffic input trunk call approval value is also set at the non-traffic approval value. Thereafter, a determination is made about whether a traffic overload condition has occurred (Step 114). Where no traffic overload condition has occurred in the ASP, an originating call approval value is set at the non-traffic originating approval value while an input trunk call approval value is set at the non-traffic input trunk call approval value (Step 115). At this time, a calculation of a terminating and output trunk call approval value is not executed so as to prevent terminating and output trunk calls from being suppressed when the ASP is under the non-traffic overload condition. Under the traffic overload condition of the ASP, a traffic approval value is calculated using the number of standby processes of the call process software (Step 116). That is, the traffic approval value is calculated by adding the process standby limiting value to the number of successful calls corresponding to the sum of numbers of originating calls, input trunk calls and terminating and output trunk calls accepted for the interval of 2 seconds, and then deducting the number of standby call processing processes from the value resulting from the addition. In other words, a value resulting from an addition of the difference between the process standby limiting value and the number of standby call processing processes to the number of successful services generated for a current interval. Thereafter, a determination is made about whether the number of standby call processing processes is more than the process standby limiting value and whether an initial control is being executed (Step 117). Where the initial control is being executed under the condition that the number of standby call processing processes is more than the process standby limiting value, a traffic approval value and a terminating and output trunk call approval value are set at zero (Step 118). Where no initial control is being executed or where the number of standby call processing processes is not more than the process standby limiting value, the condition that no initial control is being executed is displayed (Step 119). In this case, a determination is subsequently made about whether the number of standby call processing processes is more than the process standby limiting value and whether the CPU occupancy rate is more than the CPU reference value (Step 120). Where the CPU occupancy rate is more than the CPU reference value under a condition that the number of standby call processing processes is more than the process standby limiting value, a terminating and output trunk call approval value is set at the traffic approval value (Step 121). On the other hand, where the number of standby call processing processes is not more than the process standby limiting value or where the CPU occupancy rate is not more than the CPU reference value, the terminating and output trunk call approval value is set at the terminating and output trunk call approval value calculated at Step 109 of the traffic overload control routine (Step 122). The originating call approval value is then calculated by totalling the number of input trunk calls, the number of terminating calls and the number of output trunk calls respectively required for an interval of 2 seconds and then deducting the value resulting from that total from the traffic approval value (Step 123). Accordingly, the number of input trunk calls, the number of required terminating calls and the number of required output trunk calls generated for the current interval are ensured for a next interval. Also, the input trunk call approval value is calculated by totalling the number of required terminating calls and the number of required output trunk calls respectively generated for 2 seconds and then deducting the value resulting from that total from the traffic approval value (Step 124). Accordingly, the number of required terminating calls and the number of required output trunk calls respectively generated for the current interval are ensured for the next interval. By these steps, priorities are established in the order of originating call, input trunk call and output trunk call. Thereafter, a determination is made about whether a non-traffic overload condition has occurred (Step 125). Where both the traffic overload condition and the non-traffic overload condition have occurred, a smaller one of the originating call approval value calculated by use of the traffic approval value and the non-traffic originating call approval value is selected as an originating call approval value (Step 126). As an input trunk call approval value, a smaller one of the input trunk call approval value calculated by use of the traffic approval value and the non-traffic input trunk call approval value is selected. Where the terminating approval value newly calculated is different from the previous terminating approval value (Step 127), the terminating and output trunk approval value is sent to the TRC of the NTP so as to execute a terminating and output trunk call control of Step 54 (Step 128). Each of the calculated approval values is sent to the call processing software via the TRCL at intervals of 2 seconds. A decrease in call approval value is executed every time when a new call is generated. The overload control is carried out such that services are executed by accepting only calls generated until the call approval value is less than zero due to the decrease in call approval value while executing a call suppression when the call approval value is less than zero.

As apparent from the above description, the present invention provides a method for controlling overloads of processors of a hybrid full electronic switching system, capable of maintaining a stable service condition for an overload control interval while reducing the inactive time of CPU and minimizing the number of suppressed calls by controlling an overload caused by a call traffic in a manner that the call traffic overload is distinguished from an overload caused by an operation and maintenance software, and by controlling a capacity to be processed by processors depending on an overload condition.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an overload in a full electronic switching system including an operation and maintenance processor adapted to record an accounting and to provide an interface with an operator, a number translating processor adapted to perform a number translation, an internal network processor adapted to connect space switches, and a plurality of access switching processors arranged in a distributed manner around the operation and maintenance processor, the number translating processor and the internal network processor, the method comprising the steps of:

(A) executing a control for an overload caused by an operator by use of an originating call approval value, an input trunk call approval value, and a terminating and output trunk call approval value for calls from the operator to be accepted for a first predetermined time period;

(B) detecting an execution delay condition of each of the processors in the order of priorities respectively assigned to the processors and determining a system overload of each processor on the basis of the result of the detection;

(C) detecting a CPU occupancy rate of each processor at intervals of a second predetermined time period, detecting an execution delay condition of a call processing process at intervals of the first predetermined time period, and determining a traffic overload of the processor on the basis of the detected CPU occupancy rate and the detected execution delay condition; and (D) executing an overload control depending on a kind of overload generated, as one of an operator overload, a system overload and a traffic overload, in a selected one of the access switching processors associated with the generated overload at intervals of the first predetermined time period.

2. A method in accordance with claim 1, wherein the step (A) comprises the steps of:

(a) receiving, at a traffic and resource management software, the originating call approval value, the input trunk call approval value, and the terminating and output trunk call approval value generated from the operator for the first predetermined time period;

(b) sending the call approval values from the traffic and resource management software to a traffic and resource control software loaded in a selected one of the access switching processors associated with the overload; and (c) outputting the terminating and output trunk call approval value from the traffic and resource control software.

3. A method in accordance with claim 1, wherein the step (B) comprises the steps of:

(a) receiving, at a traffic and resource management software, a reference execution delay value for each of the processes from the operator in the order of priorities respectively assigned to the processes;

(b) sending the reference execution delay value from the traffic and resource management software to a traffic and resource control software loaded in a selected one of the processors associated with the overload; and (c) determining a system overload of the selected processor on the basis of the reference execution delay value.

4. A method in accordance with claim 1, wherein the step (C) comprises the steps of:

(a) receiving, at a traffic and resource management software, a CPU reference value from the operator;

(b) sending the CPU reference value from the traffic and resource management software to a traffic and resource control software loaded in a selected one of the processors associated with the overload; and (c) determining a traffic overload of the selected processor on the basis of the CPU reference value.

5. A method in accordance with claim 3, wherein the step (c) comprises the steps of:

(c-1) if the selected processor is one of the operation and maintenance processor, the number translating processor and the internal network processor, checking at intervals of the second predetermined time period about whether each of the processes of the selected processor respectively having priorities of 0, 1, 2, and 3 has delayed its execution successive times not less than the reference execution delay value, and determining the system overload on the basis of the result of the checking;

(c-2) if the system overload has occurred, informing all of the access switching processors of the occurrence of the system overload to suppress originating calls and input trunk calls in all of the access switching processors; and (c-3) demanding a decrease in non-traffic approval value of all of the access switching processors when the selected process has delayed for a time not less than the reference execution delay value under the system overload condition;

(c-4) releasing the system overload when no call suppressed indication has been generated in the selected access switching processor while the delay time of the selected process is less than the reference execution delay value under the system overload condition; and (c-5) demanding an increase in non-traffic approval value of all access switching processors when at least one call suppressed indication has been generated in the selected access switching processor while the delay time of the selected process is less than the reference execution delay value under the system overload condition.

6. A method in accordance with claim 3, wherein the step (c) comprises the steps of:

(c-1) if the selected processor is one of the access switching processors, checking at intervals for the second predetermined time period about whether each of the processes of the selected processor respectively having priorities of 0, 1, 2, and 3 has delayed its execution successive times not less than the reference execution delay value, and determining the system overload on the basis for the result of the checking;

(c-2) if the system overload has occurred, setting a non-traffic approval value at zero and thereby suppressing all originating and input trunk calls;

(c-3) executing a decrease in non-traffic approval value when the selected process has delayed for a time not less than the reference execution delay value under the system overload condition;

(c-4) releasing the system overload when no call suppressed indication has been generated under the system overload condition while the delay time of the selected process is less than the reference execution delay value; and (c-5) executing an increase in non-traffic approval value when at least one call suppressed indication has been generated while the delay time of the selected process is less than the reference execution delay value under the system overload condition.

7. A method in accordance with claim 4, wherein the step (c) comprises the steps of:

(c-1) if the selected processor is one of the operation and maintenance processor, the number translating processor and the internal network processor, checking at intervals of the second predetermined time period whether the delayed condition of the call processing process detected at intervals of the first predetermined time period has occurred predetermined successive times or has been continued for the second predetermined time period and whether the CPU occupancy rate is not less than the CPU reference value, under a condition that no traffic overload has occurred, and making a determination that a traffic overload has occurred when the delayed condition of the call processing process has occurred predetermined successive times or has been continued for the second predetermined time period while the CPU occupancy rate is not less than the CPU reference value;

(c-2) informing all of the access switching processors of the occurrence of the traffic overload to set a non-traffic overload to set a non-traffic approval value;

(c-3) demanding a decrease in non-traffic approval value of all of the access switching processors when the CPU occupancy rate is not less than the CPU reference value under the traffic overload condition;

(c-4) releasing the traffic overload when no call suppressed indication has been generated in the selected access switching processor predetermined successive times while the CPU occupancy rate is less than the CPU reference value under the traffic overload condition; and (c-5) demanding an increase in non-traffic approval value of all of the access switching processors when at least one call suppressed indication has been generated in the selected access switching processor.

8. A method in accordance with claim 5 wherein a change of the non-traffic approval value for executing the decrease in non-traffic approval value and the increase in non-traffic approval value is carried out by the steps of:

(a) when the non-traffic approval value is to be changed, setting a minimum approval value at zero, setting a maximum approval value at a sum of the number of successful originating calls and the number of successful input trunk calls respectively generated for 10 seconds, and setting the non-traffic approval value by the minimum approval value;

(b) when the decrease in non-traffic approval value is required, setting a minimum approval value at a value derived by deducting the value resulting from division of the difference between previous minimum and maximum approval values by 2 from the previous minimum approval value, setting a maximum approval value at a value derived by dividing the difference between the newly set minimum approval value and the previous maximum approval value by 2, and setting the non-traffic approval value at the newly set minimum approval value; and (c) when the increase in non-traffic approval value is required, setting a maximum approval value at a value derived by adding the value resulting from division of the difference between the previous minimum and maximum approval values by 2 to the previous maximum approval value, setting a minimum approval value at a value derived by dividing the difference between the previous minimum approval value and the newly set maximum approval value by 2, and setting the non-traffic approval value at the newly set maximum approval value.

9. A method in accordance with claim 4, wherein the step (c) comprises the steps of:

(c-1) if the selected processor is one of the access switching processors, checking at intervals of the second predetermined time period whether the delayed condition of the call processing process detected at intervals of the first predetermined time period has occurred predetermined successive times or has been continued for the second predetermined time period and whether the CPU occupancy rate is not less than the CPU reference value, under a condition that no traffic overload has occurred, and making a determination that a traffic overload has occurred when the delayed condition of the call processing process has occurred predetermined successive times or has been continued for the second predetermined time period while the CPU occupancy rate is not less than the CPU reference value;

(c-2) initializing a process standby limiting value for the call processing process when the traffic overload has occurred;

(c-3) releasing the traffic overload when no call suppressed indication has been generated predetermined successive times while the CPU occupancy rate is less than the CPU reference value under the traffic overload condition;

(c-4) increasing the process standby limiting value when at least one call suppressed indication has been generated while the CPU occupancy rate is less than the CPU reference; and (c-5) decreasing the process standby limiting value when the CPU occupancy rate is not less than the CPU reference.

10. A method in accordance with claim 1, wherein the step (D) comprises the steps of:

(d-1) when a call approval value has been determined in accordance with a command from the operator upon the overload control in the selected access switching processor, setting an operator call approval value by the determined call approval value;

(d-2) when an overload has occurred in one of the operation and maintenance processor, the number translating processor and the internal network processor or when a system overload has occurred in the selected access switching processor, calculating a non-traffic originating call approval value by deducting the number of input trunk calls generated for a predetermined interval from a non-traffic approval value, and then setting a non-traffic input trunk call approval value at the non-traffic approval value;

(d-3) when a traffic overload has occurred in the selected access switching processor, calculating a call approval value by adding a process standby limiting value for the call processing process to the number of calls accepted for the predetermined interval, and then deducting the number of standby call processing processes from the value resulting from the addition;

(d-4) when the traffic overload has occurred in the selected access switching processor, setting an originating call approval value at a value resulting from the deduction of a sum of terminating calls, input trunk calls and output trunk calls generated for the predetermined interval from the call approval value setting an input trunk call approval value at a value resulting from the deduction of the sum of terminating calls and output trunk calls generated from the predetermined interval from the call approval value, and setting a terminating and output trunk call approval value at the non-traffic approval value or the traffic approval value;

(d-5) when both the non-traffic approval value and the traffic-approval value should be calculated, setting an originating call approval value at a smaller one of the originating call approval value calculated by use of the traffic approval value and the non-traffic originating call approval value, and setting an input trunk call approval value at a smaller one of the traffic approval value and the non-traffic input trunk call approval value;

(d-6) executing a control for originating calls and input trunk calls by accepting numbers of originating calls and input trunk calls respectively corresponding to the corresponding approval values among calls generated for the predetermined interval in the selected access switching processor while suppressing the remaining calls; and (d-7) executing a control for terminating and output trunk calls by informing the number translating processor of the terminating and output trunk call approval value by the selected access switching processor and then accepting the number of terminating and output trunk calls corresponding to the terminating and output trunk approval value among calls generated for the predetermined interval in the number translating processor while suppressing the remaining calls.

* * * * *